United States Patent
Satou et al.

(10) Patent No.: US 7,614,695 B2
(45) Date of Patent: Nov. 10, 2009

(54) SEAT BACK STRUCTURE AND SEAT FOR VEHICLE

(75) Inventors: Kenji Satou, Toyota (JP); Toshirou Oosaki, Okazaki (JP); Terumitu Ozawa, Nagoya (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 400 days.

(21) Appl. No.: 11/315,325

(22) Filed: Dec. 23, 2005

(65) Prior Publication Data

US 2006/0138841 A1 Jun. 29, 2006

(30) Foreign Application Priority Data

Dec. 28, 2004 (JP) ............................ P2004-378887

(51) Int. Cl.
*A47C 3/00* (2006.01)
(52) U.S. Cl. .............. 297/284.4; 297/284.7; 297/284.8; 297/452.3
(58) Field of Classification Search .............. 297/284.4, 297/284.7, 284.8, 452.3
See application file for complete search history.

(56) References Cited

U.S. PATENT DOCUMENTS

| | | | | |
|---|---|---|---|---|
| 4,880,271 A | * | 11/1989 | Graves | 297/284.4 |
| 5,044,693 A | * | 9/1991 | Yokota | 297/452.18 |
| 5,076,643 A | * | 12/1991 | Colasanti et al. | 297/284.6 |
| 5,217,278 A | * | 6/1993 | Harrison et al. | 297/284.7 |
| 5,423,593 A | * | 6/1995 | Nagashima | 297/284.4 |
| 6,270,158 B1 | * | 8/2001 | Hong | 297/284.4 |
| 7,270,374 B2 | * | 9/2007 | Moriggi | 297/284.4 |

FOREIGN PATENT DOCUMENTS

| | | |
|---|---|---|
| JP | 2000-245568 | 9/2000 |
| JP | 2000-279261 | 10/2000 |
| JP | 2001-292855 | 10/2001 |

* cited by examiner

*Primary Examiner*—Laurie K Cranmer
(74) *Attorney, Agent, or Firm*—Whitham Curtis Christofferson & Cook, PC

(57) ABSTRACT

A seat back structure includes a back frame and a flexible sheet-like member. The back frame formed into a frame-like skeleton of a seat has a fixing portion. The flexible sheet-like member is provided within the back frame so as to support a back portion of a passenger. The flexible sheet-like member comprises a first supporting portion that is engaged with the fixing portion to regulate a substantial backward movement of the first supporting portion over a predetermined distance. The first supporting portion is slidable in substantially upper and lower directions with respect to the fixing portion.

12 Claims, 8 Drawing Sheets

↓ SEATED

SEAT BACK STRUCTURE AND SEAT FOR VEHICLE

CROSS-REFERENCE TO RELATED APPLICATIONS

This application is based on and claims the benefit of priority from the prior Japanese Patent Application No. 2004-378887, filed on Dec. 28, 2004; the entire contents of which are incorporated herein by reference.

BACKGROUND OF THE INVENTION

1. Field of the Invention

The present invention relates to a seat back support structure and a seat for a vehicle for stably supporting a pelvis portion or a lumbar portion of a passenger so as to surely make the passenger comfortable to sit in a seat when the seat is in use.

2. Description of the Related Art

In a related art, there has been known a seat back support unit in an automobile seat or the like, which unit has a structure as follows. That is, the seat back support unit is provided inside a seat back in the state where a contour mat, a resin mat or the like is supported on a seat frame through springs. A back portion of a passenger sitting in the seat is supported by the mat. FIGS. 9 and 10 show such a background-art example. In FIGS. 9 and 10, the reference numeral 21 represents a sheet-like mat such as a contour mat or a resin mat; 22, a seat frame; 23, springs for linking/supporting the mat onto the seat frame; and 24, a rod stretched in an upper portion of the seat frame.

In such a seat, however, there occurs a phenomenon that the pressure to support a pelvis portion or a lumbar portion of a passenger sitting in the seat is weakened due to a large bending distance of the mat 21 in a portion abutting against the pelvis portion or the lumbar portion of the passenger as shown in FIG. 10. As a result, there is a problem that the passenger slouches to be uncomfortable or exhausted.

On the other hand, there has been also proposed a lumbar support unit intended to improve the rigidity of a lumbar portion so as to adjust the lumbar portion to a desired retention state, for example, as disclosed in JP-A-2001-292855. However, when such a lumbar support unit is attached, there occurs a problem that the number of parts increases and the structure is also complicated. Particularly there is another problem that the lumbar support unit is not suitable to a seat intended to be thin and light.

SUMMARY OF THE INVENTION

The present invention has been made in view of the above circumstances and provides a seat back structure and a seat for vehicle which can stably support a pelvis portion or a lumbar portion of a passenger sitting in a seat so as to prevent the passenger from slouching and surely make the passenger comfortable to sit when the seat is in use, and which has a structure simple enough to be satisfactorily applied to a thin and light seat.

BRIEF DESCRIPTION OF THE DRAWINGS

These and other objects and advantages of this invention will become more fully apparent from the following detailed description taken with the accompanying drawings in which.

DESCRIPTION OF THE EMBODIMENTS

Embodiments will be described below with reference to the drawings.

Figure 1:
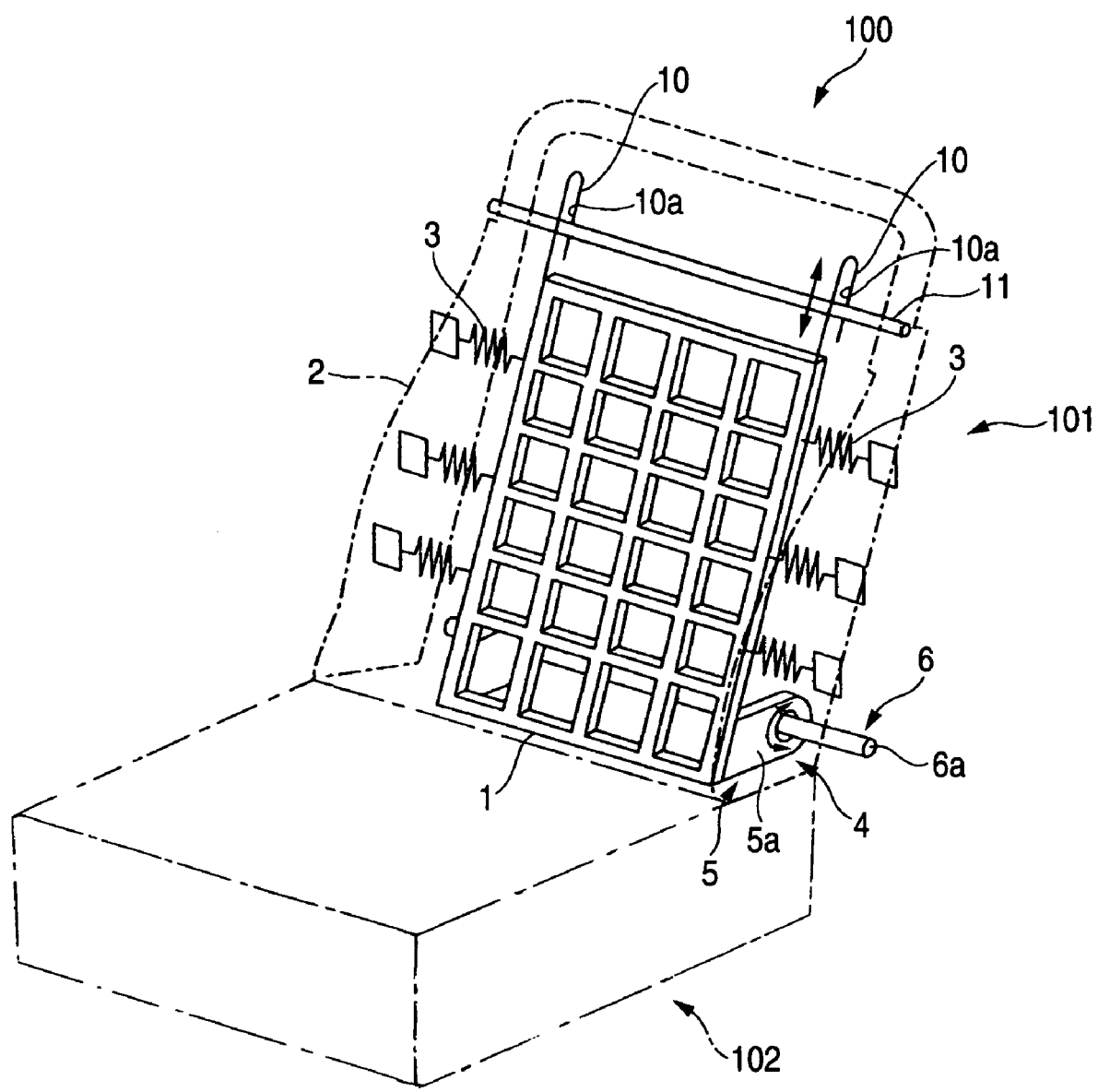
FIG. 1 is a perspective view showing an embodiment.

The drawings show a vehicle's seat. In FIG. 1, the vehicle's seat 100 includes a seat back 101, a seat cushion 102. The seat back 101 has a sheet member 1 being made of a contour mat, a resin mat or the like and deformable to follow a shape of a back portion of passenger, a sheet frame 2, a spring 3 through which the sheet member 1 is connected and supported on the seat frame 2, a regulating portion 4 regulating a backward movement of a lumbar support portion (a second supporting portion) in the sheet member 1 when the passenger is seated, an upper rod 11 provided with an upper portion of the seat frame, and a lower rod 6a provided with a lower portion of the seat frame etc.

The sheet member 1 is disposed inside the seat back in a state where the sheet member 1 is supported on the seat frame 2 through the springs 3 so that the sheet member 1 can support the back portion of the passenger sitting in the seat.

The support unit (a seat back structure) includes the sheet member 1 deformable to follow the shape of the back of the passenger, and a regulating portion 4 for regulating backward movement of the lumbar support portion in the sheet member 1 when the passenger is seated.

As a result of researches of the inventors, it has been proved that a passenger sitting in the seat is apt to slouch because a pressure to support the lumbar portion or the like of the passenger is weakened due to a large bending distance in a related-art system in which a load from the passenger's body is typically absorbed by the expansion and contraction of springs. On the other hand, the embodiments have been brought into completion based on the finding that the back of the passenger sitting in the seat can be supported comfortably if the backward movement of the lumbar support portion is regulated to enhance the pressure to support the passenger's lumbar portion or the like while the load of the passenger's back as a whole is absorbed by the deformation of the sheet member 1. Further, when the regulating portion 4 for regulating the backward movement is formed by a simple structure, the support unit can be applied to a thin-type seat.

According to the related art (JP-A-2001-292855), a lower end portion of a contour mat is formed into a hook-like shape which can engage with a stabilizer shaft. The structure is intended to support a forward force when a lumbar portion of a passenger is bent forward. The structure is clearly different from the technical idea of the embodiments which are intended to regulate a backward movement.

The regulating portion 4 includes engaging portions 5 provided on the sheet member 1 side and an engaged portion 6 provided on the seat frame 2 so as to extend horizontally.

As illustrated, the engaging portions 5 are flanges 5a provided on the opposite side portions of the lower end of the sheet member 1 so as to project toward a rear side of the seat. The engaged portion 6 is a connecting rod 6a provided in a lower portion of the seat frame 2 so as to be stretched horizontally. When the engaging portions 5 are fitted to the engaged portion 6 so as to be supported thereon, the lumbar support portion of the sheet member 1 is prevented from moving backward. Thus, the pressure to support the pelvis portion, the lumber portion, or the like, of the passenger is enhanced.

With such a configuration, the regulating portion 4 for regulating backward movement of the lumbar support portion can be formed without using any special member or the like, and the regulating portion 4 can be made simple and inexpensive.

The engaging portions 5 are brought into and rotatable engagement with the engaged portion 6.

Figure 2:
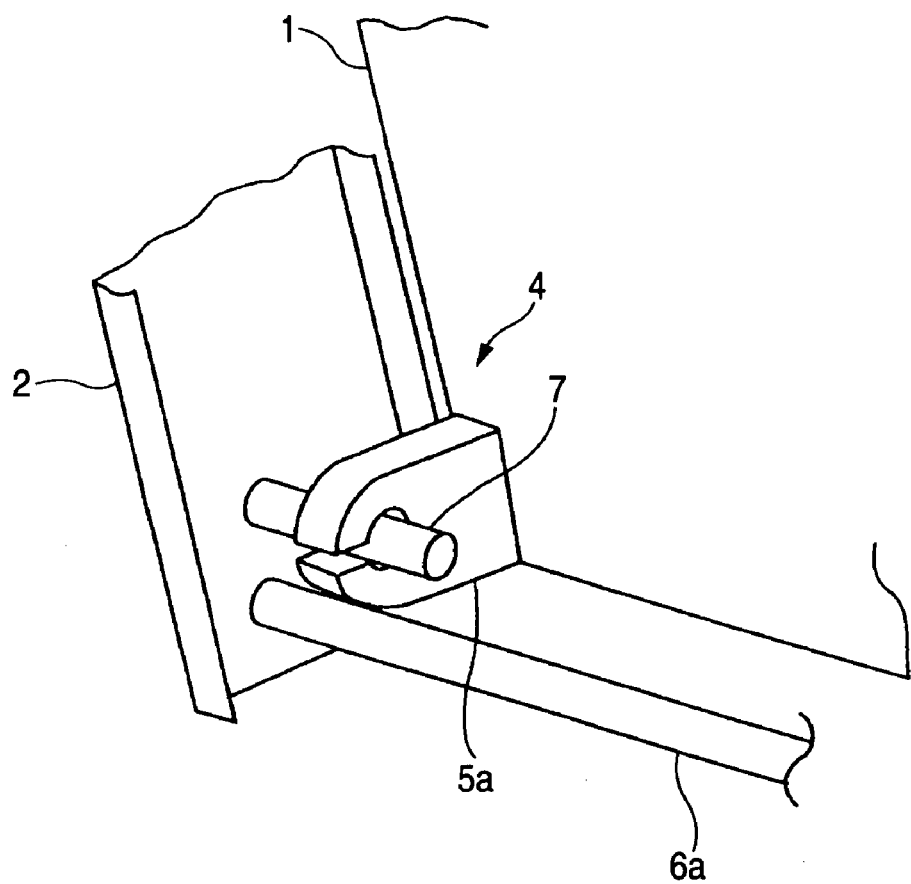
FIG. 2 is a perspective view showing another form of a regulating portion.

As illustrated, since the flanges 5a are pivotally attached to the connecting rod 6a, the sheet member 1 can rotate around the connecting rod 6a located in a lower portion of the sheet member 1. Incidentally, as shown in FIG. 2, dedicated rod pins 7 may be provided so as to project on the side surfaces of the seat frame 2 respectively. The flanges 5a are rotatably locked in, not the connecting rod 6a, but the rod pins 7, respectively.

With such a configuration, the rod pins 7 can be set in required positions in the side surfaces of the seat frame 2 regardless of the position of the connecting rod 6a so that the degree of freedom in design can be more improved.

Figure 3:
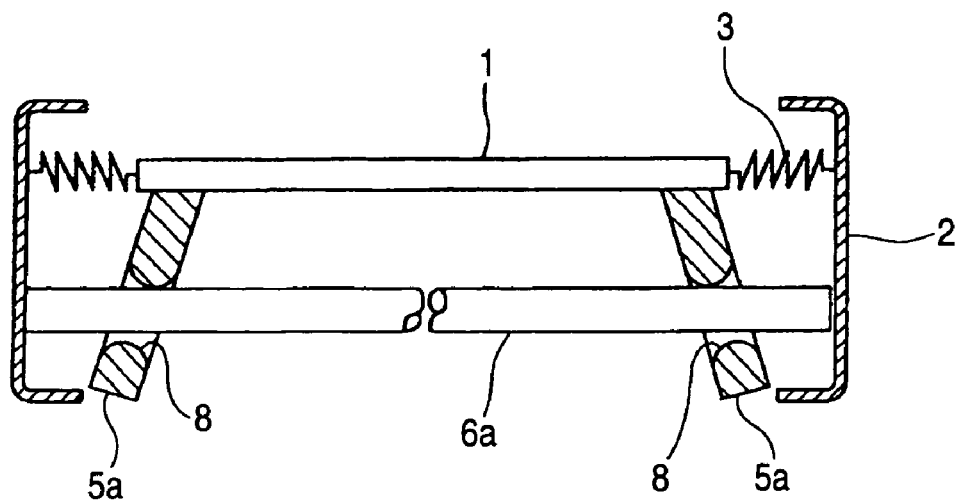
FIG. 3 is a plan view showing the embodiment.

As shown in FIG. 3, the engaging portions 5 are brought into horizontally slidable engagement with the engaged portion 6. Due to this configuration, the sheet member 1 is allowed to be deformed in the width direction as well as to make rotational motion in the lower end portion of the sheet member as described above. Thus, the sheet member 1 can be supported to follow the shape of the passenger's back better.

As illustrated, the engaging portions 5 of the sheet member side are formed as the flanges 5a projecting over a surface of the sheet member 1. An engagement hole 8 whose diameter is equal to or larger than the diameter of the engaged portion 6 (that is, the connection rod 6a) is provided in each flange 5a. Due to this configuration, the engagement between the flanges 5a and the engaged portion 6 becomes so smooth that the rotational motion and the sliding motion can be carried out more smoothly.

Figure 4:
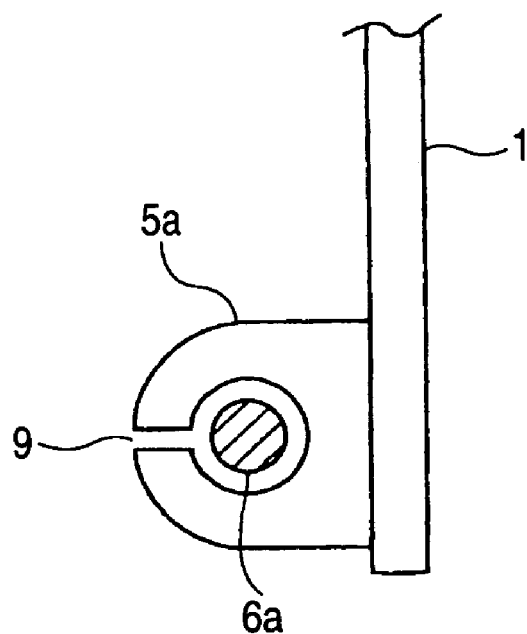
FIG. 4 is a side view showing a flange portion according to the embodiment.
Figure 5:
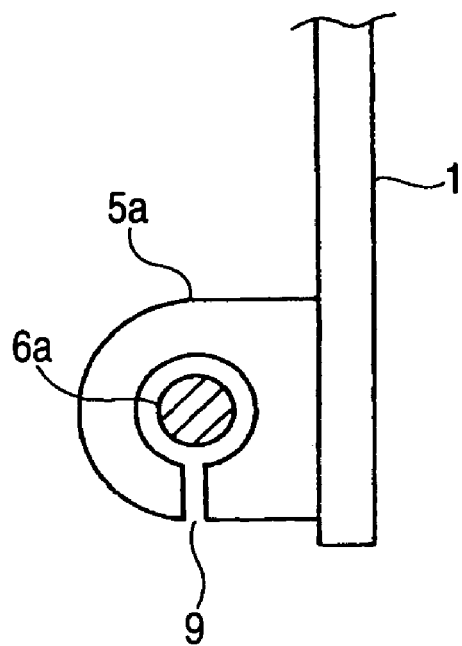
FIG. 5 is a side view showing another form of the flange portion according to the embodiment.

As shown in FIGS. 4 and 5, a slit 9 following the engagement hole 8 may be provided in each flange 5a so as to be located at an angle of 180° or 90° with respective to the sheet member 1 or in a desired position. In this case, the opening width of the slit 9 expands/contracts relatively due to the sliding motion of the flange 5a along the connection rod 6. Thus, smoother sliding motion can be obtained. In addition, in order to attach the flange 5a to the connecting rod 6, the flange 5a can be locked by press fitting through the slit 9. Thus, the workability can be improved advantageously.

Further, when the engagement hole 8 has an arc sectional shape in an axial direction of the seat frame as shown in FIG. 3, the rotational motion and the sliding motion can be advantageously carried out more smoothly.

As shown in FIG. 3, it is preferable that each flange 5a is designed to project at an angle with respect to the surface of the sheet member 1, and the flange 5a is engaged with the engaged portion 6 (that is, the connecting rod 6a) at an angle therewith.

Figure 6:
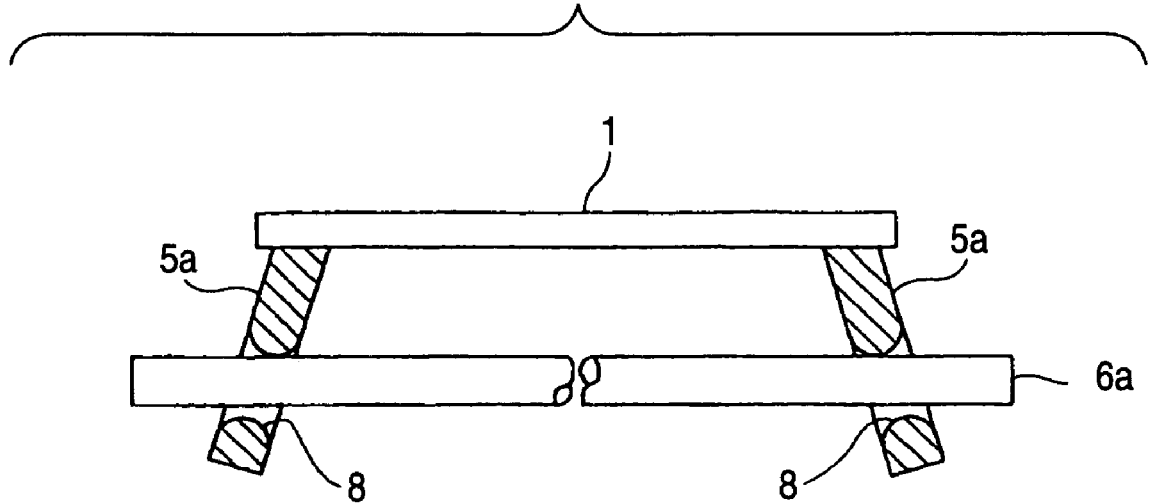
FIG. 6 is a plan view for explaining use of the embodiment.
Figure 6:
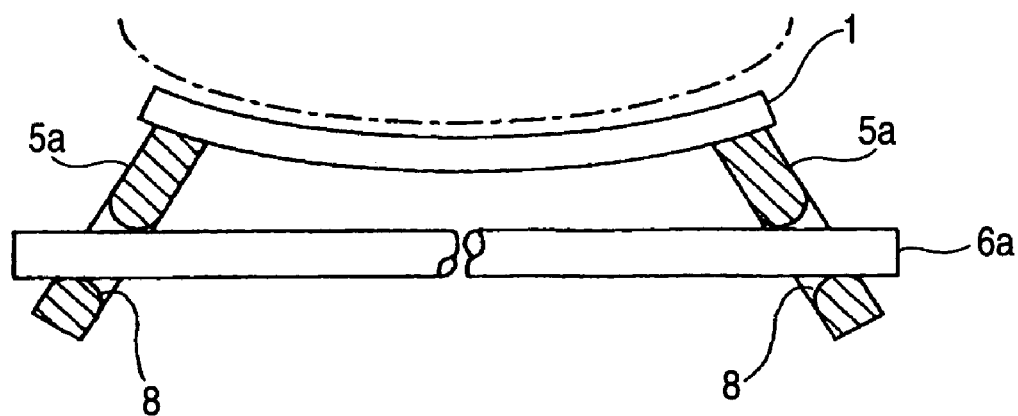

As illustrated, the flanges 5a are open like a truncated V shape so that each flange 5a turns out at an angle of about 15° with respect to the sheet member 1. Due to this configuration, as shown in FIG. 6, the sheet member 1 is bent and the flanges 5a slide and move outward with the truncated V shape opener in accordance with the load of a passenger applied to the sheet member 1 when the passenger is seated. Accordingly, the sheet member 1 is deformed to follow the passenger's back better so that the passenger can gain a feeling of perfect fitting.

Further, due to the synergy between the angle of each flange 5a and the arc sectional shape of each engagement hole 8, the sliding motion of the flange 5a becomes smoother especially advantageously.

Figure 7:
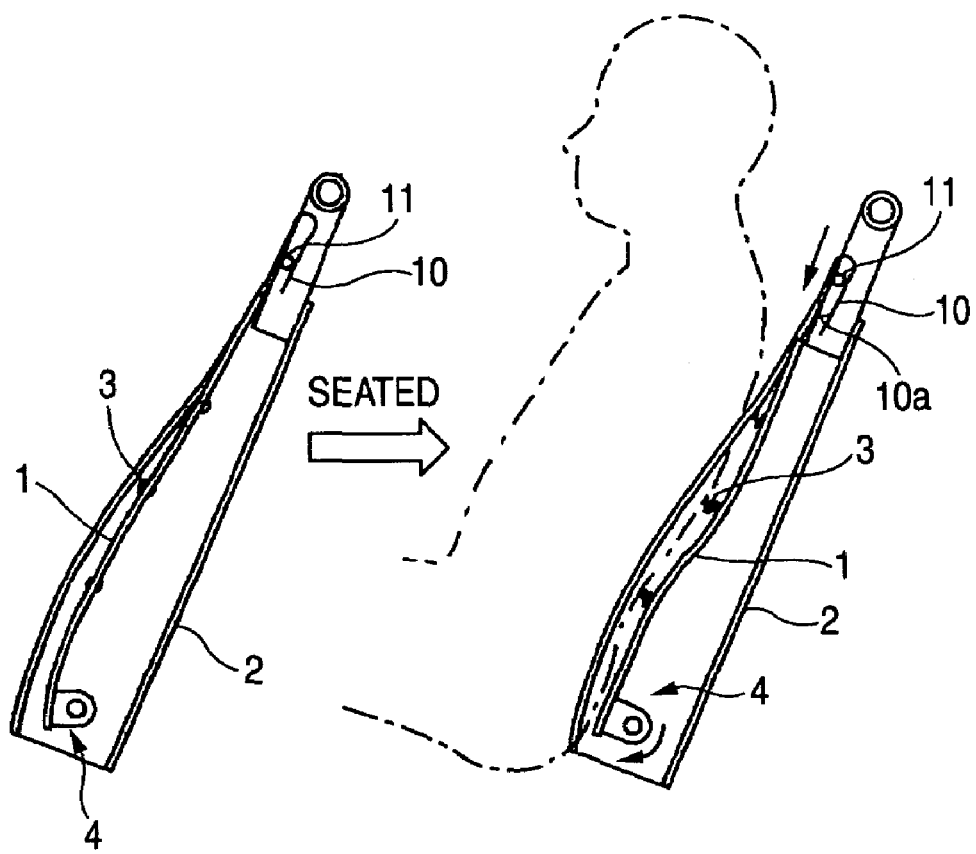
FIG. 7 is a view for explaining use of the embodiment.

As shown in FIGS. 1 and 7, the support unit may be designed so that shoulder support portion (first supporting portion) of the sheet member 1 also engages with the seat frame 2 movably in substantially upper and lower directions.

As illustrated, substantially U-shaped hook portions 10 extending upward are formed in the opposite side portions of the sheet member 1, and locked in a connecting rod 11 stretched in an upper portion of the seat frame. The front end of each hook portion 10 is extended to form a guide portion 10a for guiding the connecting rod 11 vertically.

Due to this configuration, when the load of the passenger is applied to the sheet member 1, the sheet member 1 is guided by the guide portions 10a so that the sheet member 1 can move downward. Accordingly, the passenger's back has an inverted S shape between the shoulder portion and the lumbar portion. It is said that the inverted S shape is the most stable posture. Thus, the passenger can feel comfortable to sit in the seat.

In the seat back unit configured thus, as shown in FIG. 7, sinking of the pelvis portion or the lumbar portion of the passenger is suppressed by the effect of the regulating portion 4 regulating backward movement of the lumbar portion support portion when the passenger sits in the seat. Thus, the pelvis portion or the lumbar portion of the passenger is supported stably. In addition, the seat back unit has a structure in which the upper portion of the sheet member 1 can move downward while the sheet member 1 is rotatable around the lower portion, and further the sheet member 1 is flexible horizontally. Accordingly, the passenger is prevented from slouching, and the sheet member 1 is deformable to follow the passenger's back. Thus, the passenger can gain a feeling of perfect fitting.

Figure 8A:
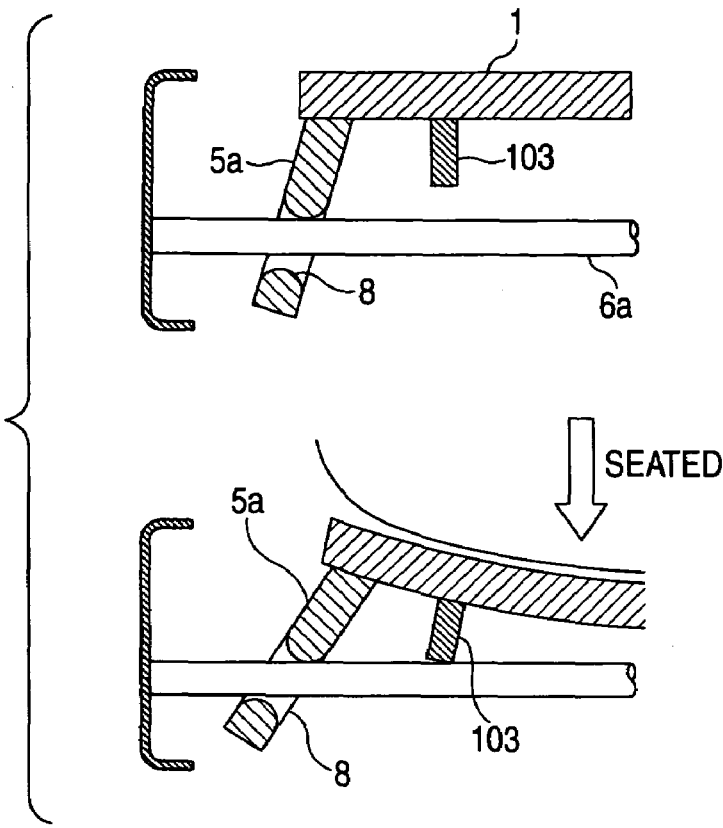
FIG. 8A is a plan view for explaining of use of stopper according to the embodiment.

According to the above-embodiment, as shown in FIG. 8A, a stopper 103 may be provided with the sheet member 1. The stopper 103 is nearer to a center side of the sheet member 1 than the flange 5a. The stopper 103 projects rearward from the sheet member 1 so that the stopper 103 contacts with the connecting rod 6a while the sheet member 1 is backward deformed. The stopper 103 may also regulate a slide of the flange 5a in a lateral direction so that the sheet member 1 having the flange 5a is prevented from deforming excessively. Accordingly, the lumber portion of the passenger can be surely supported while the passenger can feel good fitting.

Figure 8B:
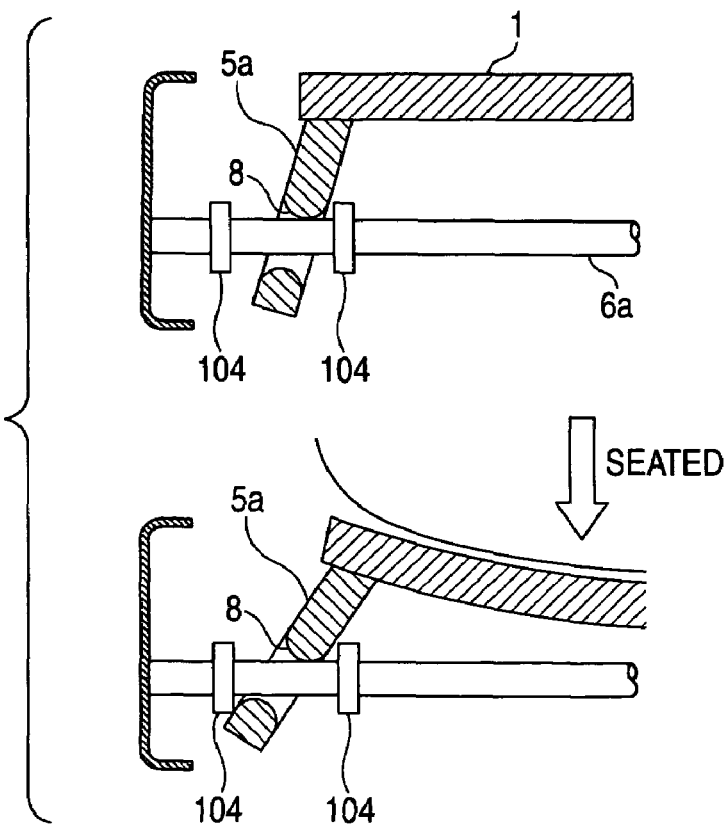
FIG. 8B is a plan view for explaining of use of another stopper according to the embodiment.
Figure 9:
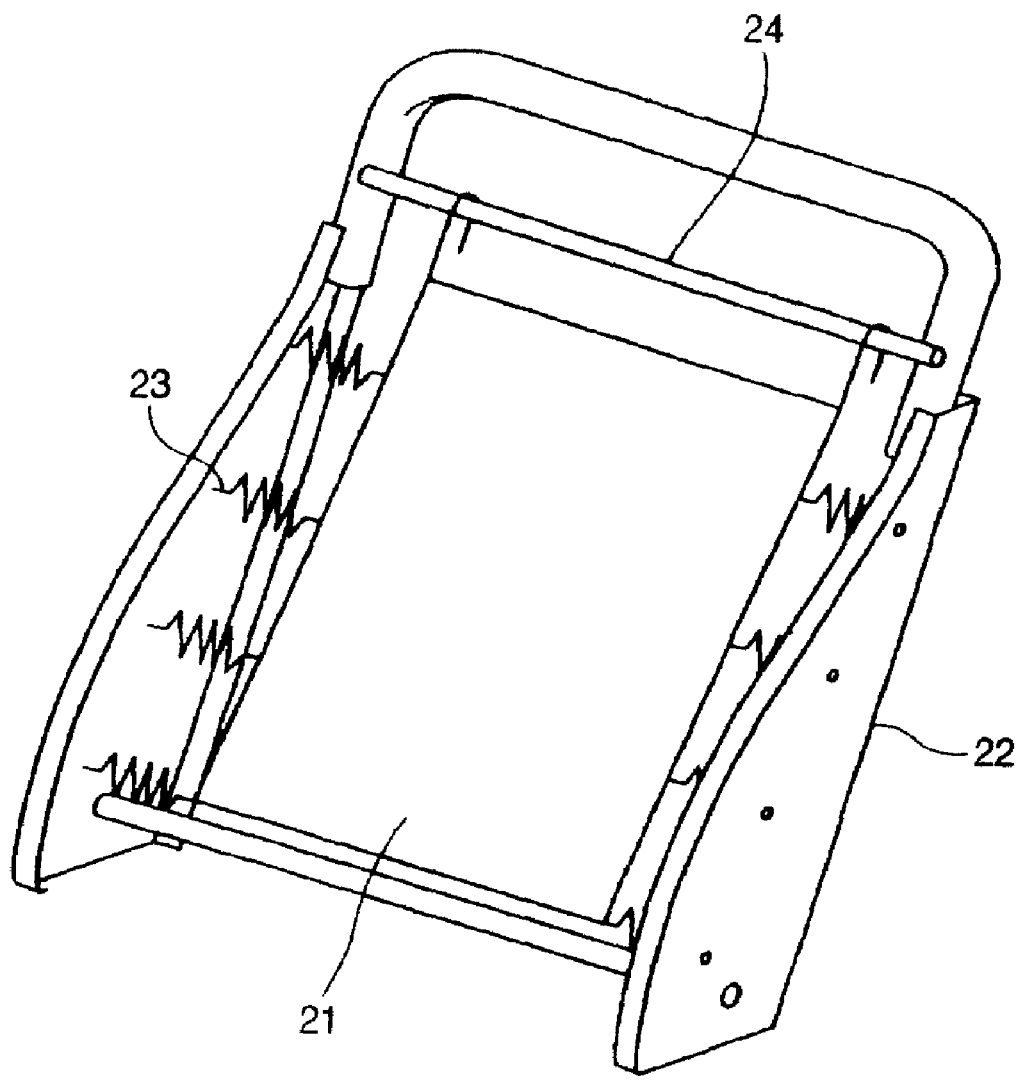
FIG. 9 is a perspective view showing a background-art example.
Figure 10:
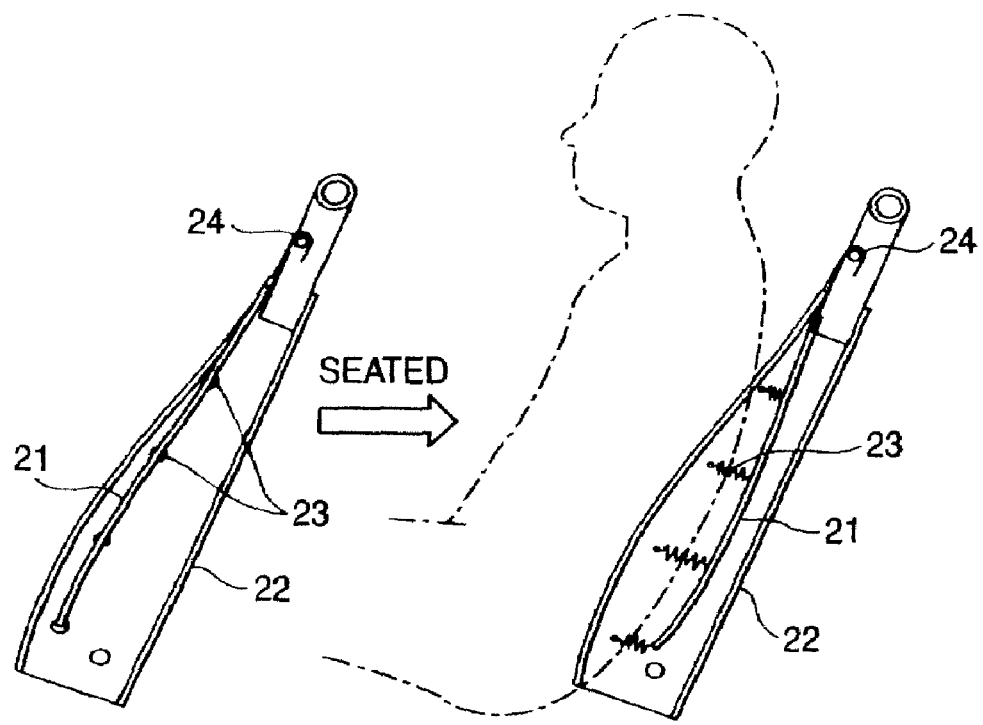
FIG. 10 is a view for explaining use of the background-art example.

According to the above-embodiment, as shown in FIG. 8B, a pair of stoppers 104 may be provided with the connecting rod 6a so as to support the flange 5. The one stopper is nearer to a center side of the connecting rod 6a than the flange 5. The other stopper is far from the center side of the connecting rod 6a than the flange 5. The pair of stoppers 104 may also regulate a slide of the flange 5 in a lateral direction so that the sheet member 1 having a flange 5 is prevented from deforming excessively. Accordingly, the lumber portion of the passenger can be surely supported while the passenger can feel good fitting.

According the above-embodiments, the seat back unit is provided inside a seat back so as to be supported on the seat frame 2 through the springs 3 while supporting the back portion of the passenger when the passenger is seated. The seat back unit is designed to have a sheet member 1 deformable to follow the shape of the passenger's back, and a regulating portion 4 regulating backward movement of the lumbar support portion in the sheet member 1 when the passenger is seated. Accordingly, when the seat is in use, the pelvis portion or the lumbar portion of the passenger is supported stably so that the passenger is prevented from slouching. Thus, it is possible to surely make the passenger comfortable to sit in the seat. Further, it is possible to apply the support unit to a structure simple enough to be satisfactorily applied to a thin and light seat.

According to the above-embodiments, the seat back unit includes a sheet member deformable to follow a shape of the back of the passenger, and a regulating portion for regulating backward movement of the lumbar support portion in the sheet member when the passenger is seated. Accordingly, the pelvis portion or the lumbar portion of the passenger is prevented from sinking backward when the seat is in use, so that the passenger is prevented from slouching. In addition, the sheet member can be deformed to follow the shape of the back of the passenger so as to surely make the passenger comfortable to sit.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined solely by the following claims and their equivalents.

What is claimed is:

1. A seat back structure comprising:
    a back frame being formed into a frame-like skeleton of a seat, the back frame comprising a connecting rod stretched in an upper portion of the seat frame and a regulating portion in a lower portion of the seat frame; and
    a flexible sheet-like member being provided within the back frame so as to support a passenger, the flexible sheet-like member comprising a first supporting portion, which is a back support portion, and a second supporting portion, which is a lumbar support portion, the first supporting portion being in the form of substantially U-shaped hook portions extending upward above the connecting rod portion and configured to permit downward movement and engagement with the connecting rod portion when a load of a passenger is applied to the flexible sheet-like member, the second supporting portion being engaged with the regulating portion of the back frame to regulate a substantial backward movement of the second supporting portion over a predetermined distance.

2. A seat back structure according to claim 1, wherein the flexible sheet-like member further comprises:
    an engaging portion being engaged with the regulating portion of the back frame to regulate a substantial backward movement of the second supporting portion over a predetermined distance.

3. A seat back structure according to claim 2, wherein the flexible sheet-like member further comprises:
    a bent portion being on a lower side of the second supporting portion, the bent portion being disposed backwardly deformable to bend according to a load from a passenger side so as to follow a shape of the back portion of the passenger.

4. A seat back structure according to claim 3, wherein the flexible sheet-like member is located at a substantially intermediate portion between a first supporting member and a second supporting member of said back frame.

5. A seat back structure according to claim 1, further comprising:
    an urethane pad being mounted to at least partially cover a front portion of the back frame and the sheet-like member.

6. A seat back structure comprising:
    a back frame being formed into a frame-like skeleton of a seat, the back frame comprising a regulating portion; and
    a flexible sheet-like member being provided within the back frame so as to support a passenger, the flexible sheet-like member comprising a first supporting portion, which is a back support portion, and a second supporting portion, which is a lumbar support portion, the second supporting portion being engaged with the regulating portion of the back frame to regulate a substantial backward movement of the second supporting portion over a predetermined distance, and the first supporting portion being slidable in a substantially vertical direction with respect to the back frame,
    wherein the back frame has an upper rod extending between a right side of the back frame and a left side of the back frame,
    wherein the first supporting portion has a hook-like engagement portion extending above and engaged with the upper rod and is slidable in a substantially downward direction with respect to the upper rod and engageable with respect to the upper rod when a load of a passenger is applied to the flexible sheetlike member, and
    wherein the hook-like engagement portion is integrally provided with the flexible sheet-like member.

7. The seat back structure according to clam 6, wherein the back frame has a lower rod extending between a right side of the back frame and a left side of the back frame, and
    wherein the second supporting portion has engaging portions which engage the lower rod and are slidable to regulate backward movement of the second supporting portion.

8. A seat back structure comprising:
    a back frame being formed into a frame-like skeleton of a seat, the back frame comprising a regulating portion; and
    a flexible sheet-like member being provided within the back frame so as to support a back portion of a passenger, the flexible sheet-like member comprising a first and second supporting portions being engaged with the regulating portion of the back frame to regulate a substantial backward movement of the first and second supporting portions over a predetermined distance, and the first supporting portion being slidable in a substantially vertical direction with respect to the regulating portion of the back frame, wherein the back frame has an upper rod extending between a right side of the back frame and a left side of the back frame, wherein the first supporting portion has a hook-like engagement portion extending above the upper rod and is downwardly slidable for engagement with the upper rod of when a load of a passenger is applied to the flexible sheet-like member, wherein the hook-like engagement portion is integrally provided with the flexible sheet-like member, wherein the regulating portion has a lower rod extending between a right side of the back frame and a left side of the back frame, wherein the second supporting portion has at least one pair of flange portions that is rotatable with respect to the lower rod of the regulating portion and slidably engageable with the lower rod of the regulating portion in a substantially lateral direction, and wherein the pair of flange portions is integrally provided with the flexible sheet-like member so as to be located away from each other in a width direction of the flexible sheet-like member.

9. A seat back structure according to claim 8, wherein the pair of the flange portions are backwardly projected from a back surface of the flexible sheet-like member while separating from each other, and the pair of the flange portions are engaged with the lower rod of the regulating portion at predetermine angle with respect to the lower rod of the regulating portion, a slidable distance of the pair of the flange portions with respect to the lower rod of the regulating portion is regulated within a predetermined amount.

10. A seat for vehicle comprising:
a seat cushion; and
a seat back comprising:
  a back frame formed into a frame-like skeleton of a seat, the back frame comprising a connecting rod stretched in an upper portion of the seat frame a regulating portion in a lower portion of the seat frame; and
  a flexible sheet-like member being provided within the back frame so as to support a passenger, the flexible sheet-like member comprising a first supporting portion, which is a back support portion, and a second supporting portion, which is a lumbar support portion, the first supporting portion being in the form of substantially U-shaped hook portions extending upward above the connecting rod portion and configured to permit downward movement and engagement with the connecting rod portion when a load of a passenger is applied to the flexible sheet-like member, the second supporting portion being engaged with the regulating portion of the back frame to regulate a substantial backward movement of the second supporting portion over a predetermined distance, and the first supporting portion being slidable in substantially upper and lower directions with respect to the back frame.

11. A seat back structure comprising:
a back frame formed into a frame-like skeleton of a seat;
a flexible sheet-like member being resiliently supported within the back frame, the flexible sheet-like member being deformable to follow a shape of back and shoulder portions of a passenger;
an upper rod provided with an upper portion of the seat frame and a lower rod provided with a lower portion of the seat frame;
a regulating portion attached to a lower portion of the flexible sheet-like member and the lower rod for regulating a backward movement of a lumbar support portion in the flexible sheet-like member when the passenger is seated, the regulating portion including engaging portions provided on either side of the flexible sheet-like member and engaging the lower rod provided on the seat frame; and
substantially U-shaped hook portions extending upward formed in opposite side portions of the flexible sheet-like member and engaged on the upper rod, a front end of each hook portion being extended to form a guide portion for guiding movement of the flexible sheet-like member vertically so that when the load of the passenger is applied to the flexible sheet-like member, the flexible sheet-like member is guided by the guide portions so that the flexible sheet-like member can move downward so that the substantially U-shaped hook portions engage the upper rod.

12. The seat back structure according to claim 11, wherein the engaging portions of the regulating portion are flanges provided on opposite side portions of a lower end of the flexible sheet-like member so as to project toward a rear side of the seat back structure such that when the engaging portions are fitted to the engaged portion so as to be supported thereon, the lumbar support portion of the flexible sheet-like member is prevented from moving backward.

* * * * *